United States Patent
Dou et al.

(10) Patent No.: US 12,260,105 B1
(45) Date of Patent: Mar. 25, 2025

(54) CONVERTING THE FORMAT OF A DISTRIBUTED OBJECT STORAGE WITH REDUCED WRITE OPERATIONS

(71) Applicant: VMware LLC, Palo Alto, CA (US)

(72) Inventors: Ruiling Dou, Shanghai (CN); Tao Xie, Shanghai (CN); Zongliang Li, Shanghai (CN); Asit Desai, Cupertino, CA (US); Wenguang Wang, Santa Clara, CA (US); Litao Xia, Shanghai (CN)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 18/471,392

(22) Filed: Sep. 21, 2023

(51) Int. Cl.
*G06F 3/06* (2006.01)

(52) U.S. Cl.
CPC .......... *G06F 3/0647* (2013.01); *G06F 3/0608* (2013.01); *G06F 3/0689* (2013.01)

(58) Field of Classification Search
CPC ..... G06F 3/0647; G06F 3/0608; G06F 3/0689
See application file for complete search history.

(56) References Cited

U.S. PATENT DOCUMENTS

| | | | | |
|---|---|---|---|---|
| 6,950,900 | B1* | 9/2005 | McKean | G06F 11/2092 |
| | | | | 711/114 |
| 10,417,190 | B1* | 9/2019 | Donlan | G06F 16/128 |
| 11,030,063 | B1* | 6/2021 | Shipilov | G06F 3/067 |
| 2002/0103779 | A1* | 8/2002 | Ricart | G06F 16/214 |
| 2008/0270720 | A1* | 10/2008 | Tanabe | G06F 3/067 |
| | | | | 711/170 |
| 2010/0011037 | A1* | 1/2010 | Kazar | G06F 3/0619 |
| | | | | 707/E17.01 |
| 2010/0235383 | A1* | 9/2010 | Kashiwase | G06F 16/119 |
| | | | | 711/216 |
| 2012/0059989 | A1* | 3/2012 | Hamaguchi | G06F 3/0683 |
| | | | | 711/E12.019 |
| 2012/0173882 | A1* | 7/2012 | Horn | G06F 21/78 |
| | | | | 713/189 |
| 2013/0047153 | A1* | 2/2013 | Emaru | H04L 67/34 |
| | | | | 718/1 |
| 2013/0055371 | A1* | 2/2013 | Kumano | H04L 67/1097 |
| | | | | 726/7 |
| 2016/0171034 | A1* | 6/2016 | Konik | G06F 16/13 |
| | | | | 707/803 |
| 2020/0019311 | A1* | 1/2020 | Zolotow | G06F 3/067 |
| 2020/0019318 | A1* | 1/2020 | Sakashita | G06F 3/0665 |

(Continued)

*Primary Examiner* — Christopher D Birkhimer
(74) *Attorney, Agent, or Firm* — King Intellectual Asset Management

(57) ABSTRACT

The disclosure herein describes converting a disk cluster to a different format. A format conversion instruction associated with a disk cluster is received. A first subgroup of disks of the disk cluster that are the emptiest disks of the disk cluster are identified and all data is evacuated from the first subgroup of disks to other disks of the disk cluster. The first subgroup of disks is reformatted based on the received format conversion instruction. A group of data objects stored in the disk cluster is converted based on the format conversion instruction and the converted group of data objects are written to the reformatted first subgroup of disks. The process iterates through the disks of the disk cluster to reformat all disks and convert all data objects based on the received format conversion instruction. The process reduces the write operations required to convert the format of the disk cluster.

20 Claims, 10 Drawing Sheets

(56) References Cited

U.S. PATENT DOCUMENTS

| | | | |
|---|---|---|---|
| 2021/0223993 A1* | 7/2021 | Esaka | G06F 3/0659 |
| 2022/0013145 A1* | 1/2022 | Ren | G06F 3/0608 |
| 2022/0019528 A1* | 1/2022 | Wang | G06F 12/0646 |
| 2022/0019529 A1* | 1/2022 | Wang | G06F 3/0673 |
| 2022/0058161 A1* | 2/2022 | Wang | G06F 16/116 |
| 2022/0066674 A1* | 3/2022 | Li | G06F 3/0661 |
| 2022/0103650 A1* | 3/2022 | Tanaka | G06F 3/0608 |
| 2022/0107746 A1* | 4/2022 | Marais | G06F 3/0647 |
| 2022/0137821 A1* | 5/2022 | Monden | G06F 3/0605 |
| | | | 711/154 |
| 2022/0229574 A1* | 7/2022 | Tanpairoj | G06F 3/0679 |
| 2023/0047056 A1* | 2/2023 | Chang | G06F 3/0604 |
| 2023/0153008 A1* | 5/2023 | Yoshida | G06F 3/0635 |
| | | | 711/165 |

* cited by examiner

CONVERTING THE FORMAT OF A DISTRIBUTED OBJECT STORAGE WITH REDUCED WRITE OPERATIONS

BACKGROUND

In large, distributed data storage systems, completely reformatting disk clusters and associated distributed object storage (e.g., to enable encryption on a non-encrypted disk cluster, to disable encryption on an encrypted disk cluster, and/or otherwise to convert the format of the entire disk cluster) requires significant time and expenditure of system resources, including large quantities of write operation to transfer data in the disk cluster multiple times.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for converting a disk cluster to a different format is described. A format conversion instruction associated with a disk cluster is received. A first subgroup of disks of the disk cluster that are the emptiest disks of the disk cluster are identified and all data is evacuated from the first subgroup of disks to other disks of the disk cluster. The first subgroup of disks is reformatted based on the received format conversion instruction. A group of data objects stored in the disk cluster is converted based on the format conversion instruction and the converted group of data objects are written to the reformatted first subgroup of disks.

BRIEF DESCRIPTION OF THE DRAWINGS

The present description will be better understood from the following detailed description read considering the accompanying drawings, wherein:

Corresponding reference characters indicate corresponding parts throughout the drawings. In FIGS. 1 to 6, the systems are illustrated as schematic drawings. The drawings may not be to scale. Any of the figures may be combined into a single example or embodiment.

DETAILED DESCRIPTION

Figure 1:
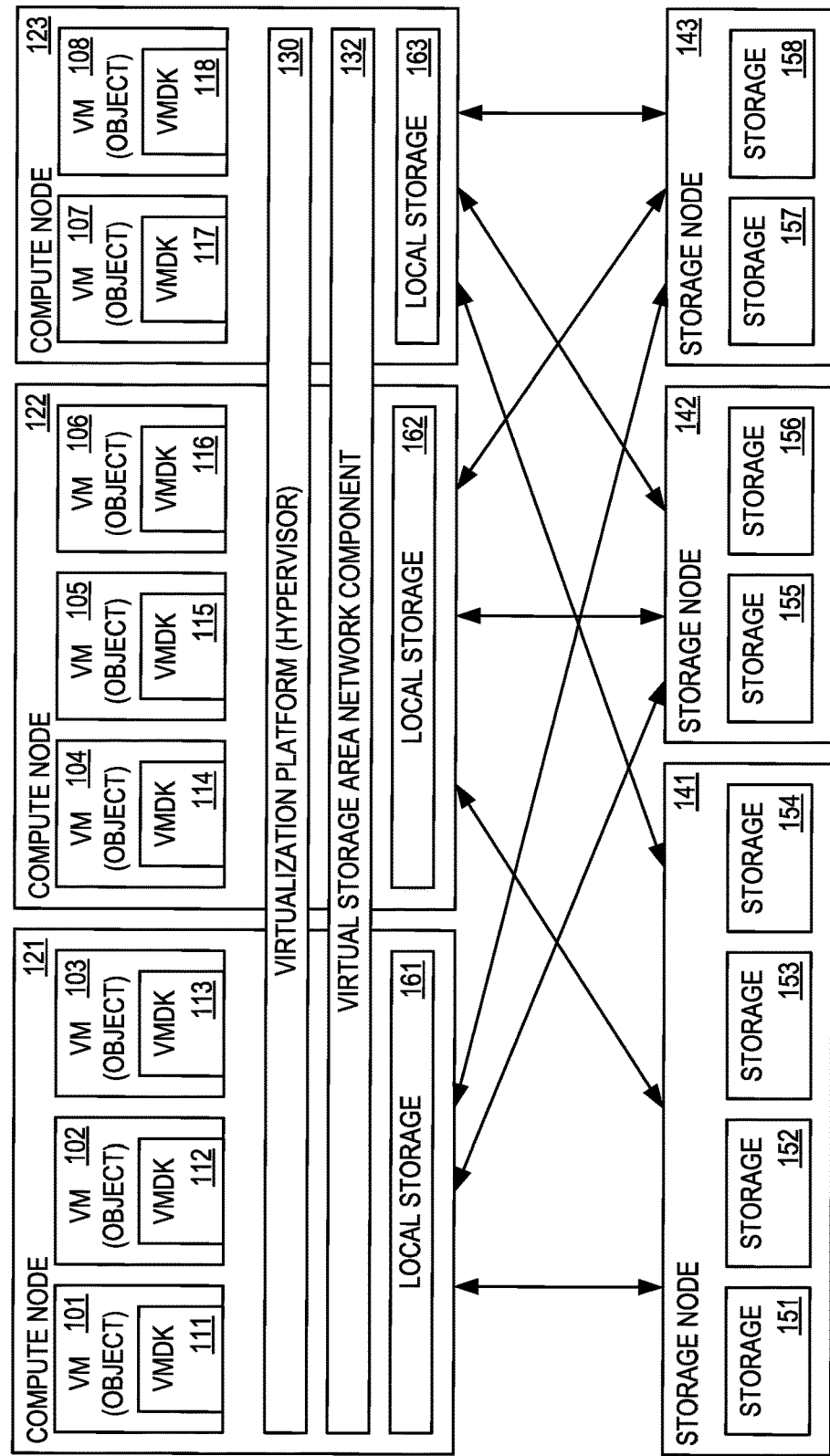
FIG. 1 is a block diagram illustrating a system that is comprised of a set of compute nodes interconnected with each other and a set of storage nodes according to an embodiment.

Aspects of the disclosure provide a computerized method and system for converting the format of a disk cluster and associated distributed object storage using a reduced quantity of write operations. The disclosure describes the formation of "slack space" in the disk cluster by clearing out the data on some of the emptiest disks and reformatting those disks according to the requested format conversion. Unconverted data objects are then converted according to the requested format conversion and written to the reformatted slack space disks. Examples of the described process iterate through the disk cluster, identifying groups of emptiest disks, evacuating and reformatting those identified groups of disks, and then writing converted data objects to those reformatted groups of disks until the format of the entire disk cluster is converted.

The disclosure operates in an unconventional manner at least by the formation of slack space in the disk cluster by clearing out the data on some of the emptiest disks and reformatting those disks according to the requested format conversion. The reformatted, unconverted data objects are then converted according to the requested format conversion and written to the reformatted slack space disks, such that at least some of the data objects are transferred between disks of the disk cluster only once during the format conversion process. This is in contrast to existing methods of format conversion that require each data object to be transferred between disks at least twice to complete the format conversion: a first phase of data object conversion and then a second phase of disk reformatting, wherein the data object components stored on a disk must be evacuated to other disks. Thus, the described format conversion process is more efficient with respect to system resources expended to perform write operations and with respect to time taken to perform format conversions.

Further, in some examples of the described methods and systems, machine learning (ML) models are used to efficiently select data objects for conversion and/or to avoid interrupting other processes that make use of the disk cluster during the format conversion process. For example, an ML model is trained and used to select data objects for conversion and writing to reformatted disks in such a way that the available capacity of a group of likely emptiest disks is prioritized for use in the next iteration of the process. Such data object selection decisions reduce the quantity of write instructions that are used to evacuate data from the group of disks to be reformatted during the next iteration, thereby improving the write instruction efficiency of the process as a whole.

Additionally, or alternatively, an ML model is trained and used to predict which data object components are the most likely to be affected by a write instruction over a defined future time period and the described process is configured to then avoid selecting data objects associated with the data object components that are most likely to be affected. Thus, the described format conversion process proceeds with the conversion of the disk cluster with reduced interruption of other processes that are making use of the disk cluster to store data.

It should be understood that, in some examples, the disclosure is configured to reformat or otherwise convert a disk cluster as well as reformatting or otherwise converting any associated distributed object storage components that make use of the disk cluster. Thus, while many portions of the description specifically describe the reformatting of a disk cluster, in such examples, associated distributed object storage is also being reformatted to complete the described processes.

FIG. 1 is a block diagram illustrating a system 100 that is comprised of a set of compute nodes 121-123 interconnected with each other and a set of storage nodes 141-143 according to an embodiment. In other examples, a different number of compute nodes and storage nodes are used without departing from the description. Each compute node hosts multiple objects, which are virtual machines (VMs), containers, applications, and/or any compute entity that can consume storage, in some examples. When objects are created, they are designated as global or local, and the designation is stored in an attribute. For example, compute node 121 hosts objects 101, 102, and 103; compute node 122 hosts objects 104, 105, and 106; and compute node 123 hosts objects 107 and 108. Some of objects 101-108 are local objects. In some examples, a single compute node hosts 50, 100, or a different number of objects. Each object uses a virtual machine disk (VMDK). For example, VMDKs 111-118 are used by objects 101-108, respectively. Other implementations using different formats are also possible. A virtualization platform 130, which includes hypervisor functionality at one or more of computer nodes 121, 122, and 123, manages objects 101-108.

Figure 6:
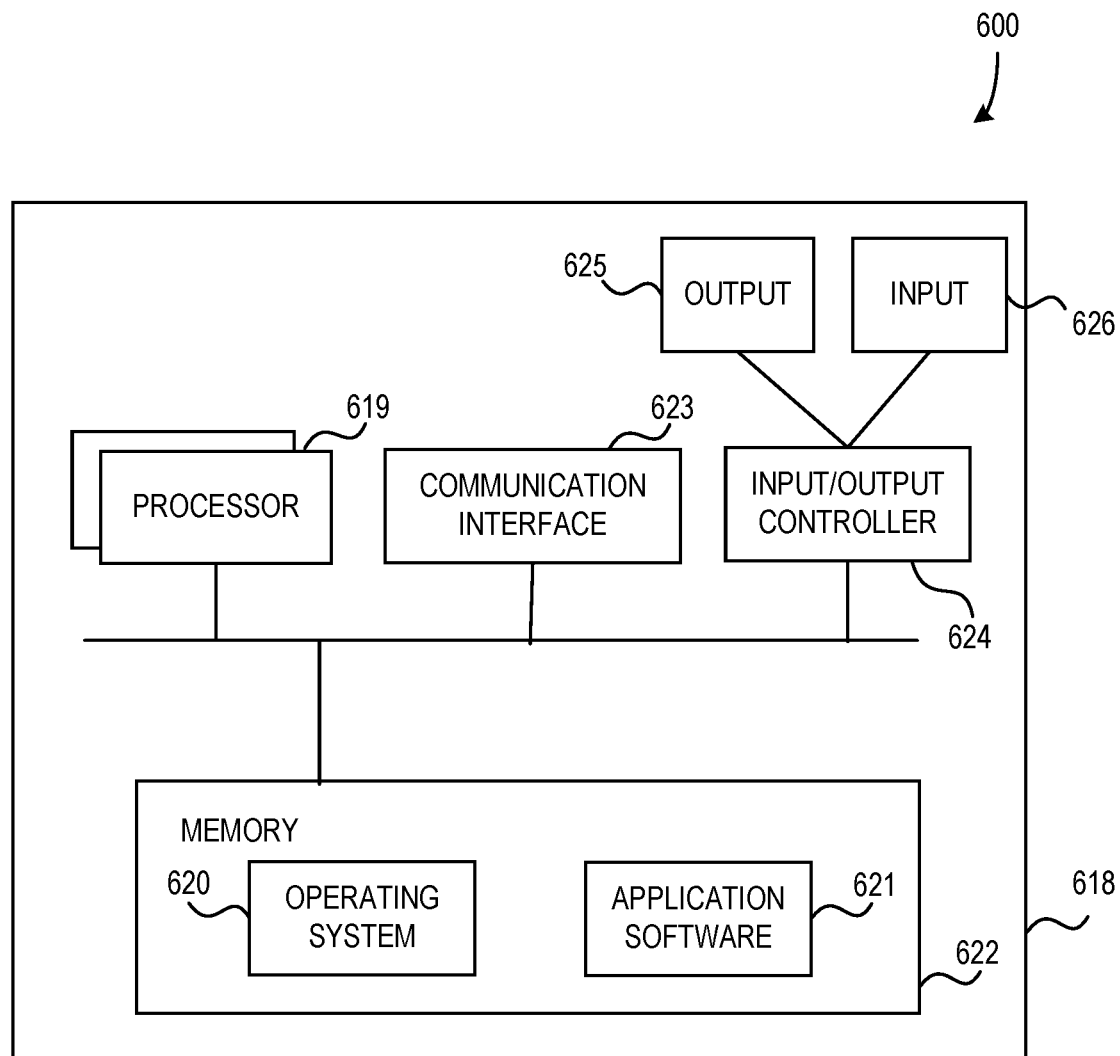
FIG. 6 illustrates an example computing apparatus as a functional block diagram.

In some examples, various components of system 100, for example compute nodes 121, 122, and 123, and storage nodes 141, 142, and 143 are implemented using one or more computing apparatuses 618 of FIG. 6.

Virtualization software provides software-defined storage (SDS) by pooling storage nodes across a cluster, creating a distributed, shared data store (e.g., a storage area network (SAN)). In some examples with distributed arrangements, servers are distinguished as compute nodes (e.g., compute nodes 121, 122, and 123) and storage nodes (e.g., storage nodes 141, 142, and 143). In such examples, storage nodes attach large quantities of storage devices (e.g., flash, solid state drives (SSDs) and non-volatile memory express (NVMe) and Persistent Memory (PMEM)) processing power are limited beyond the ability to handle input/output (I/O) traffic. For example, storage node 141 has storage 151, 152, 153, and 154; storage node 142 has storage 155 and 156; and storage node 143 has storage 157 and 158. In other examples, a single storage node includes a different number of physical storage components without departing from the description. In the described examples, storage nodes 141-143 are treated as a SAN with a single global object, enabling any of objects 101-108 to write to and read from any of storage 151-158 using a virtual SAN component 132. Virtual SAN component 132 executes in compute nodes 121-123.

In some examples, thin provisioning is used and storage nodes 141-143 do not require significantly more processing power than is needed for handling I/O traffic. This arrangement is less expensive than many alternative hyperconverged environments in which all of storage nodes 141-143 have the same or similar processing capability as compute node 121. Using the disclosure, compute nodes 121-123 can operate with a wide range of storage options.

In some examples, compute nodes 121-123 each include a manifestation of virtualization platform 130 and virtual SAN component 132. Virtualization platform 130 manages the generating, operations, and clean-up of objects 101 and 102, including the moving of object 101 from compute node 121 to another compute node, to become a moved object. For example, virtual SAN component 132 permits objects 101 and 102 to write incoming data from object 101 and incoming data from object 102 to storage nodes 141, 142, and/or 143, in part, by virtualizing the physical storage components of the storage nodes. Further, in some examples, the compute nodes 121, 122, and 123 include and make use of local storage nodes 161, 162, and 163, respectively, for storing some data used during the operation of the system 100 without departing from the description.

Figure 2:
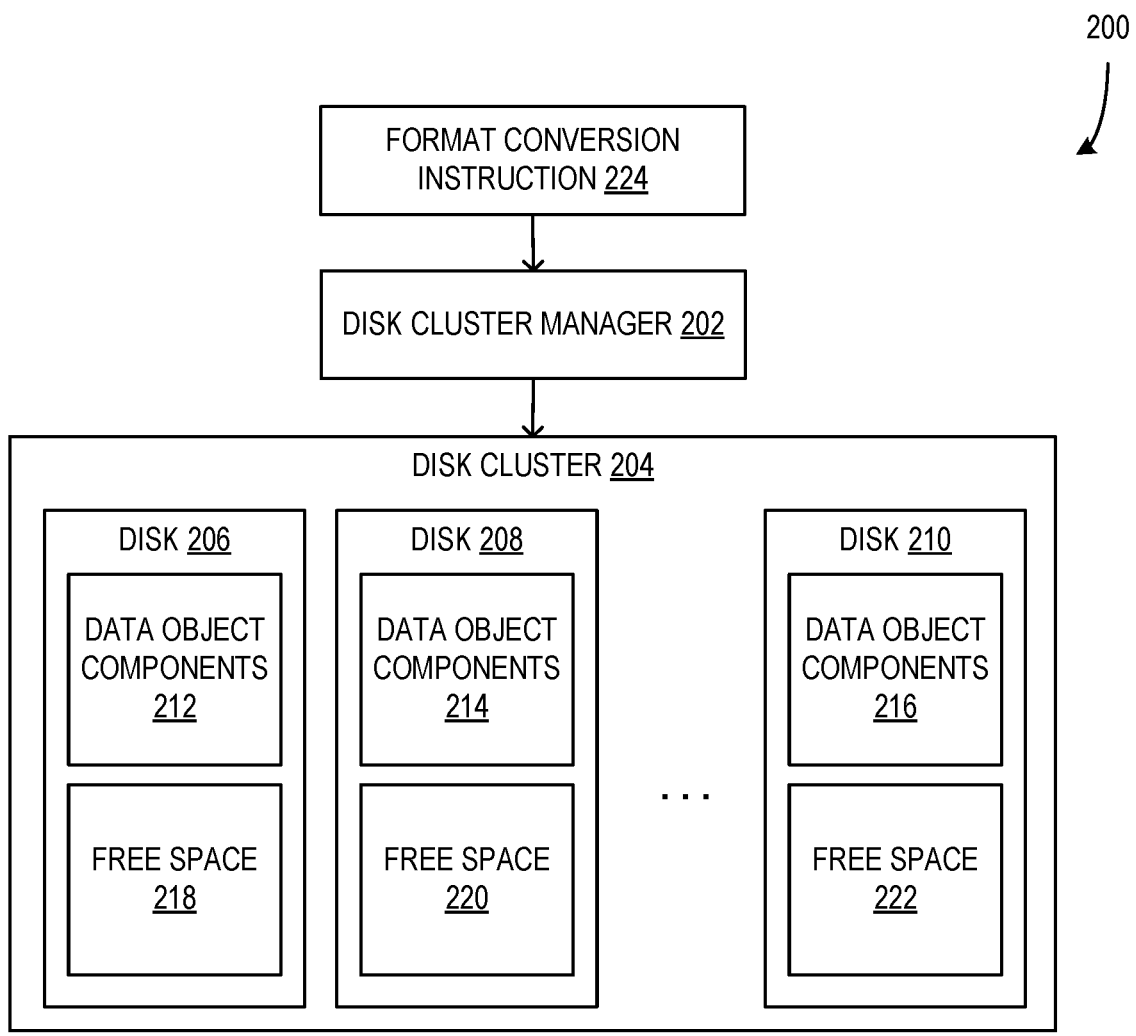
FIG. 2 is a block diagram illustrating a system that is configured to perform format conversion operations on a disk cluster according to an embodiment.

FIG. 2 is a block diagram illustrating a system 200 that is configured to perform format conversion operations on a disk cluster 204 and data object components 212-216 of distributed objects stored thereon according to an embodiment. In some examples, the system 200 is included in or otherwise associated with a system such as system 100 of FIG. 1.

The system 200 includes a disk cluster manager 202 and an associated disk cluster 204. The disk cluster 204 includes a group of disks 206-210. The disks 206-210 store data object components 212-216 and/or have some quantity of free space 218-222 (e.g., storage space that is not currently occupied by stored data). When the disk cluster manager 202 receives a format conversion instruction 224, the disk cluster manager 202 performs format conversion operations or otherwise causes format conversion operations to be performed on the disks 206-210 of the disk cluster 204.

The disk cluster manager 202 includes hardware, firmware, and/or software configured for performing format conversion operations on the disks 206-210 of the disk cluster 204 and/or otherwise interact with the disk cluster 204 to move data objects and associated components, format disk space, write data, and/or delete data. In some examples, the disk cluster manager 202 is included in or otherwise associated with a virtualization platform and/or hypervisor such as virtualization platform 130. Additionally, or alternatively, the disk cluster manager 202 is included in or otherwise associated with a virtual SAN component such as virtual SAN component 132.

In some examples, the disk cluster manager 202 is configured to perform operations including moving data object components between disks (e.g., moving some or all of data object components 212 from disk 206 to the free space 220 of disk 208), converting the format of or otherwise altering the data of data object components, reformatting or otherwise altering the configuration of the disks themselves, and/or other operations as described herein.

The disk cluster 204 includes hardware, firmware, and/or software configured to store data such as the data object components 212, 214, and 216 on disks such as disks 206, 208, and 210. In some examples, the disk cluster 204 is included in or otherwise associated with a storage node such as storage nodes 141-143 and/or a compute node such as compute nodes 121-123 of system 100 in FIG. 1.

In some examples, the disks 206-210 are physical disk devices that include hardware, firmware, and/or software configured for storing data and interacting with the stored data based on received instructions from other entities, such as the disk cluster manager 202. The data object components 212-216 stored on the disks 206-210 are data structures that make up data objects, such as VMs 101-108 of system 100 in FIG. 1. In other examples, the data object components are components of other types of data objects (e.g., data objects for storing data that are configured using a Redundant Array of Independent Disks (RAID) or other data structures).

The format conversion instruction 224 is received by or otherwise provided to the disk cluster manager 202. In some examples, the format conversion instruction 224 is a request or other message that is sent, or caused to be sent, to the disk cluster manager 202 by a user or other entity interacting with the system 200. Further, in some examples, the format conversion instruction 224 includes data indicating a type of format conversion that is to be performed on the disk cluster 204 or some or all of the disks 206-210 therein. Additionally, or alternatively, the format conversion instruction 224 includes data or information that indicates specific parameters or other details of the format conversion to be performed.

For example, the format conversion instruction 224 instructs the disk cluster manager 202 to encrypt the entire disk cluster 204 from an unencrypted state. The format conversion instruction 224 includes information indicating a specific encryption algorithm to use and any necessary parameters for that specific encryption algorithm, such as key values or seed values used in the encryption process. In response to the format conversion instruction 224 in such examples, the disk cluster manager 202 performs operations to encrypt the disks 206-210 and then data object components 212-216 stored on the disks 206-210 using the processes described herein.

In other examples, the format conversion instruction 224 instructs the disk cluster manager 202 to decrypt the entire disk cluster 204 from an encrypted state, and/or to change how the disk cluster 204 is encrypted in the encrypted state. In such examples, the process of the format conversion is similar but the actual operations to convert the format of data and/or disks differs based on the type of format conversion being performed. It should be understood that, in other examples, other types of format conversions are performed on disk clusters without departing from the description. Other exemplary types of format conversions include changing a data storage format of the disks 206-210, rearranging data in in the disk cluster 204 for compatibility with a new storage architecture, or the like.

FIGS. 3A-3E are block diagrams illustrating a process for performing a format conversion of distributed object components and an associated disk cluster according to an embodiment. In some examples, the process described by FIGS. 3A-3E is performed in association with a system such as systems 100 and/or 200 of FIGS. 1 and 2.

Figure 3A:
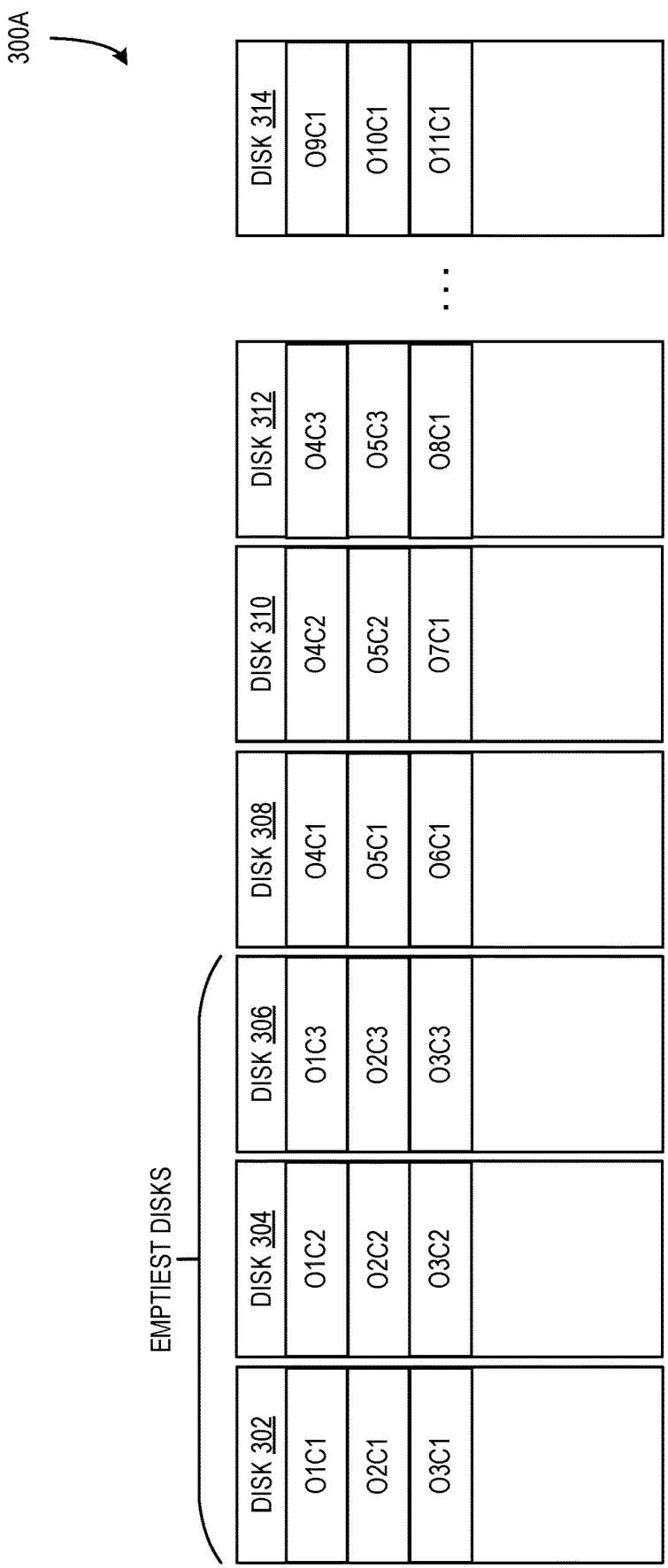
FIGS. 3A-3E are block diagrams illustrating a process for performing a format conversion on a disk cluster according to an embodiment.

FIG. 3A illustrates an initial state 300A of a disk cluster comprising disks 302-314. The disks are shown containing data object components that are named according to a convention that indicates the data object that they are a part of and the specific component number. For instance, in disk 302, a data object component called O1C1 is associated with a data object O1 and is the first component, labeled C1, of that data object. Thus, the data object O1 has two other components, O1C2 and O1C3, shown on disks 304 and 306, respectively. There are data object components illustrated for eleven different data objects in state 300A of the disk cluster, but it should be understood that, while seven disks are illustrated in FIG. 3A, in other examples, more, fewer, or otherwise different disks are included in the described disk cluster without departing from the description. Further, in some examples, more, fewer, or otherwise different data objects and associated data object components are stored in the disks of the disk cluster in the same or different arrangements without departing from the description.

When a format conversion instruction (e.g., format conversion instruction 224) is received that requires the data object components and the disks to be converted to a different format, the described format conversion process is performed. First, a slack space is created in the disks of the disk cluster by evacuating data object components from one or more disks to other disks within the disk cluster. To perform format conversion operations on the disks themselves, in most cases, the disks must be empty of data, or the data stored therein must also be stored elsewhere to be preserved, because the format conversion operations to the disks delete or otherwise corrupt data stored on the disks. In some such examples, the emptiest group of disks is identified such that the evacuation of data thereon requires less data transfers to other disks. It should be understood that, in many examples, an "emptiest disk" or the "emptiest group of disks" includes disks that currently store the least amount of data and/or that have the most available capacity for storing data when compared to other disks in the disk cluster. As illustrated, the disks 302, 304, and 306 have been identified as the emptiest disks in the disk cluster. Thus, the disks 302-306 currently store less data than other groups of three disks in the disk cluster.

While the emptiest disks identified in FIG. 3A are consecutive disks in the illustration, in other examples, the identified emptiest disks are not consecutive with each other. Further, while the identified group of emptiest disks includes three disks, in other examples, other quantities of disks are used in the group of emptiest disks (e.g., one emptiest disk, four emptiest disks, etc.). In some examples, the quantity of emptiest disks identified is based on a requirement for compatibility with storing data objects of the disk cluster. For instance, in an example, the data objects in the disk cluster are stored using a RAID configuration that requires the data components of the data objects be stored redundantly across three different disks (e.g., two redundant data components and an associated metadata component). As a result of this requirement, the quantity emptiest disks identified is three, enabling data objects to be fully written to the group of emptiest disks after the format conversion operations are complete as described below. Thus, in a different example, if the data object configuration required redundancy across five disks, then the quantity of disks in the identified group of emptiest disks would be five. In other examples, other methods are used to determine the quantity of disks in the group of emptiest disks without departing from the description.

Figure 3B:
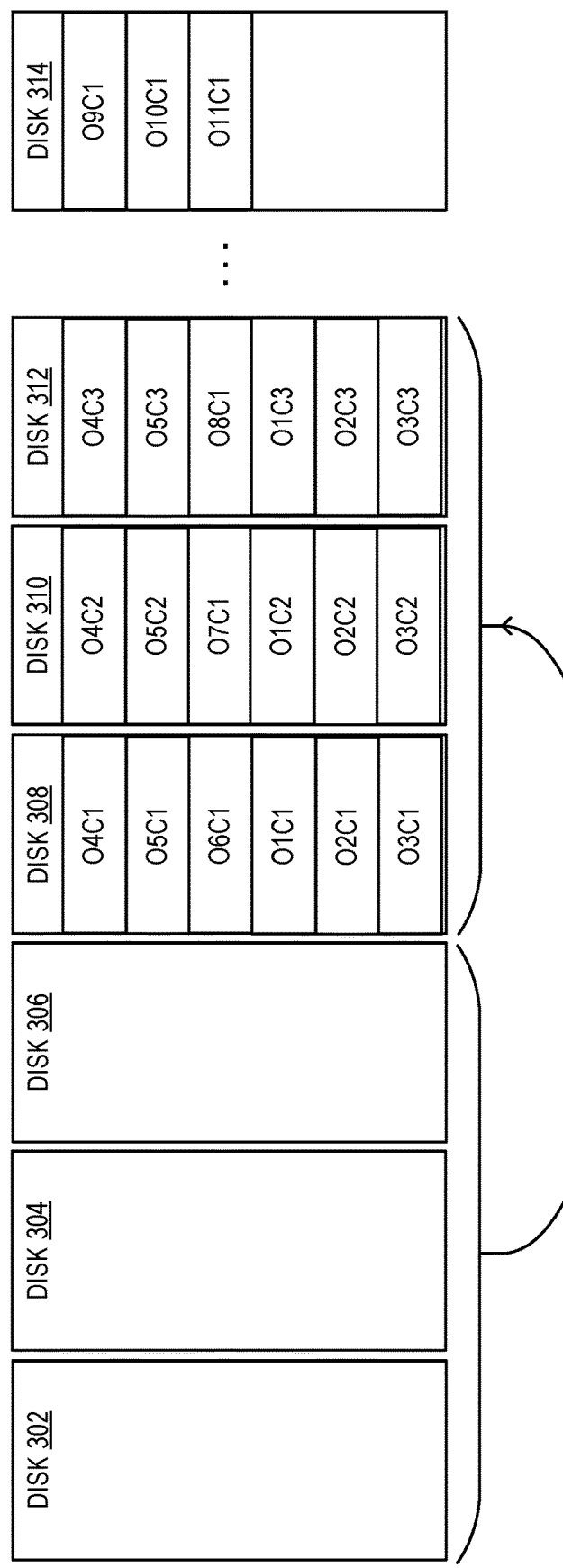

In FIG. 3B, a state 300B of the disk cluster is illustrated. The data object components that were stored in the disks 302-306 have been evacuated or otherwise transferred to the disks 308-312, such that the disks 302-306 are empty. When this is complete, the format conversion operations, or reformatting operations, of the disks 302-306 are performed. In some examples, these operations include performing encryption operations or decryption operations on the disk space of the disks 302-306. In other examples, other types of format conversion operations are performed without departing from the description.

It should be understood that, while the data object components from disks 302-306 have been transferred to the illustrated disks 308-312, in other examples, the data object components are transferred to more and/or different disks within the disk cluster without departing from the description.

Figure 3C:
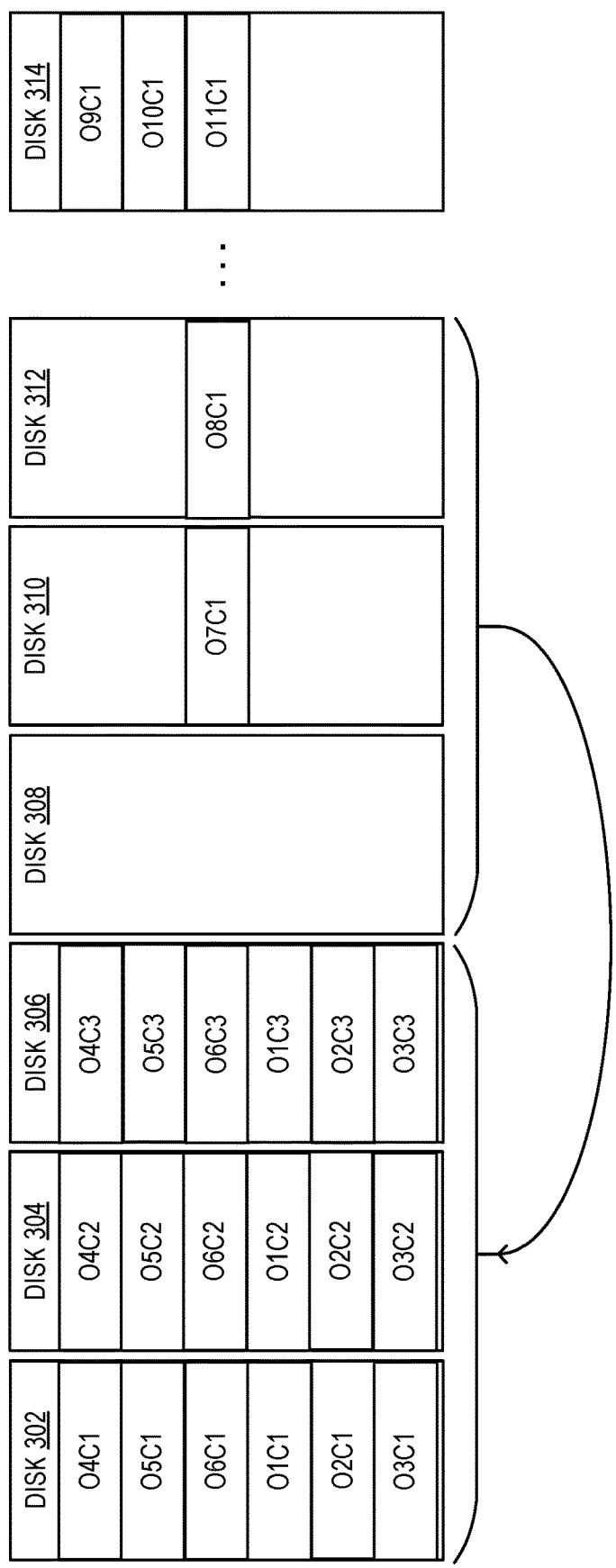

In FIG. 3C, a state 300C of the disk cluster is illustrated. Data objects 01-06 are converted based on the associated format conversion instruction (e.g., encrypted, decrypted, or otherwise transformed) and transferred to the reformatted disks 302-306. As illustrated, the disks 308-312 have been evacuated for the most part, save for data object components of data objects 7 and 8. In some examples, the data objects that are selected for conversion and transfer to the reformatted disks are selected based on their order within the disk cluster (e.g., the next data object in with a component stored in the disk cluster that has not been converted in selected). Additionally, or alternatively, in some examples, the data objects are selected in such a way that a group of disks in the disk cluster become empty or close to empty. For instance, in an example, the disks 308-312 are identified as candidates for the next group of emptiest disks and, as a result, most of the data objects stored on the disks 308-312 are selected for conversion and transfer to the disks 302-306.

Further, in some examples, data objects are converted and transferred to the disks 302-306 until the disks are full (e.g., another data object cannot be transferred to the disks 302-306 in its entirety based on the remaining capacity of the disks 302-306). Thus, in some such examples, data objects are selected for conversion and transfer based on size in addition to or instead of other selection methods (e.g., a smaller data object is selected because it can be fully stored in remaining space of the disks 302-306 rather than a data object that, if transferred, would render several disks empty).

Figure 3D:
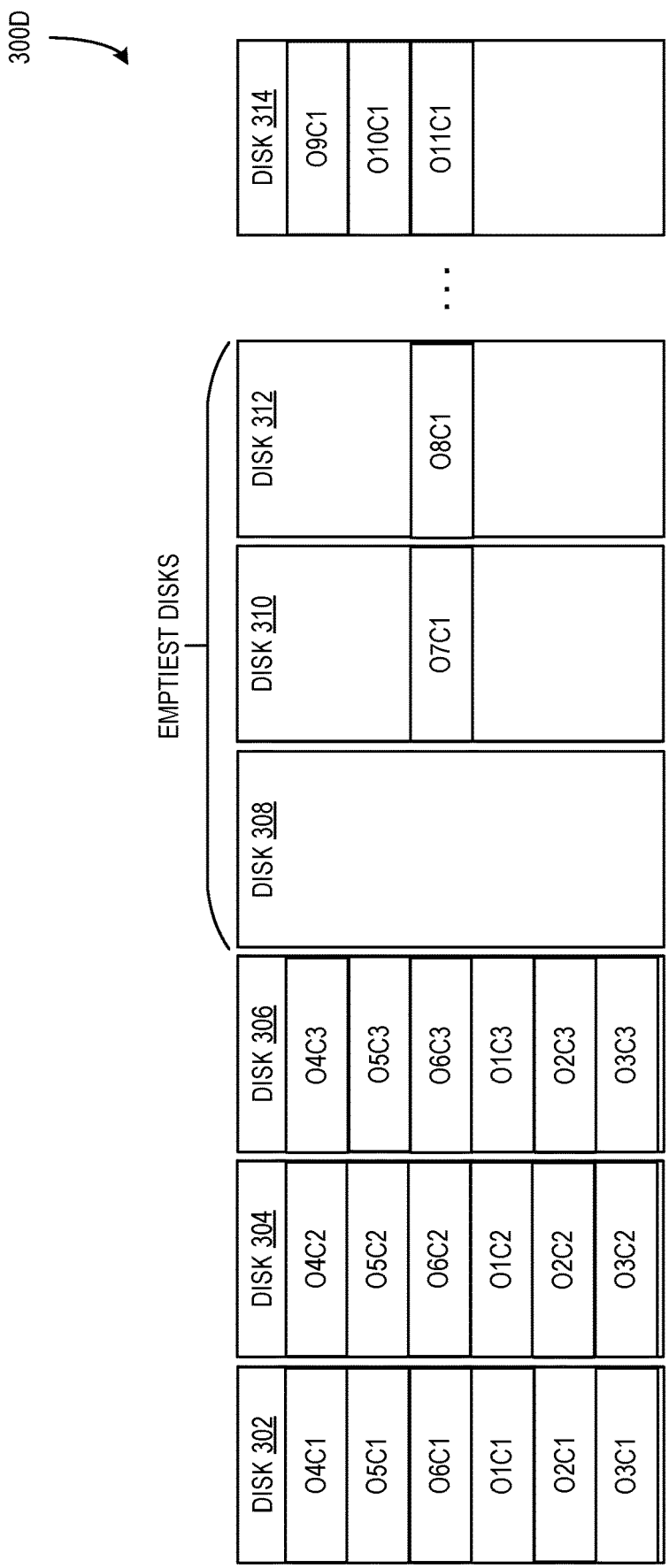

In FIG. 3D, a state 300D of the disk cluster is illustrated. After the conversion and transfer of most of the data objects from disks 308-312, those disks are identified as the group of emptiest disks. This step in the process is the same as the step illustrated in FIG. 3A. It should be understood that, in other examples, some or all of the disks in the identified group of emptiest disks are not the disks from which the data objects were transferred in the previous step.

As illustrated, the disk 310 includes a data object component O7C1 and the disk 312 includes a data object component O8C1. In some examples, these two data object components are moved to two different disks in the disk cluster. Alternatively, because the two data object components are from different data objects, in some examples, the two data object components are moved to a single disk (e.g., disk 314) of the disk cluster.

Figure 3E:
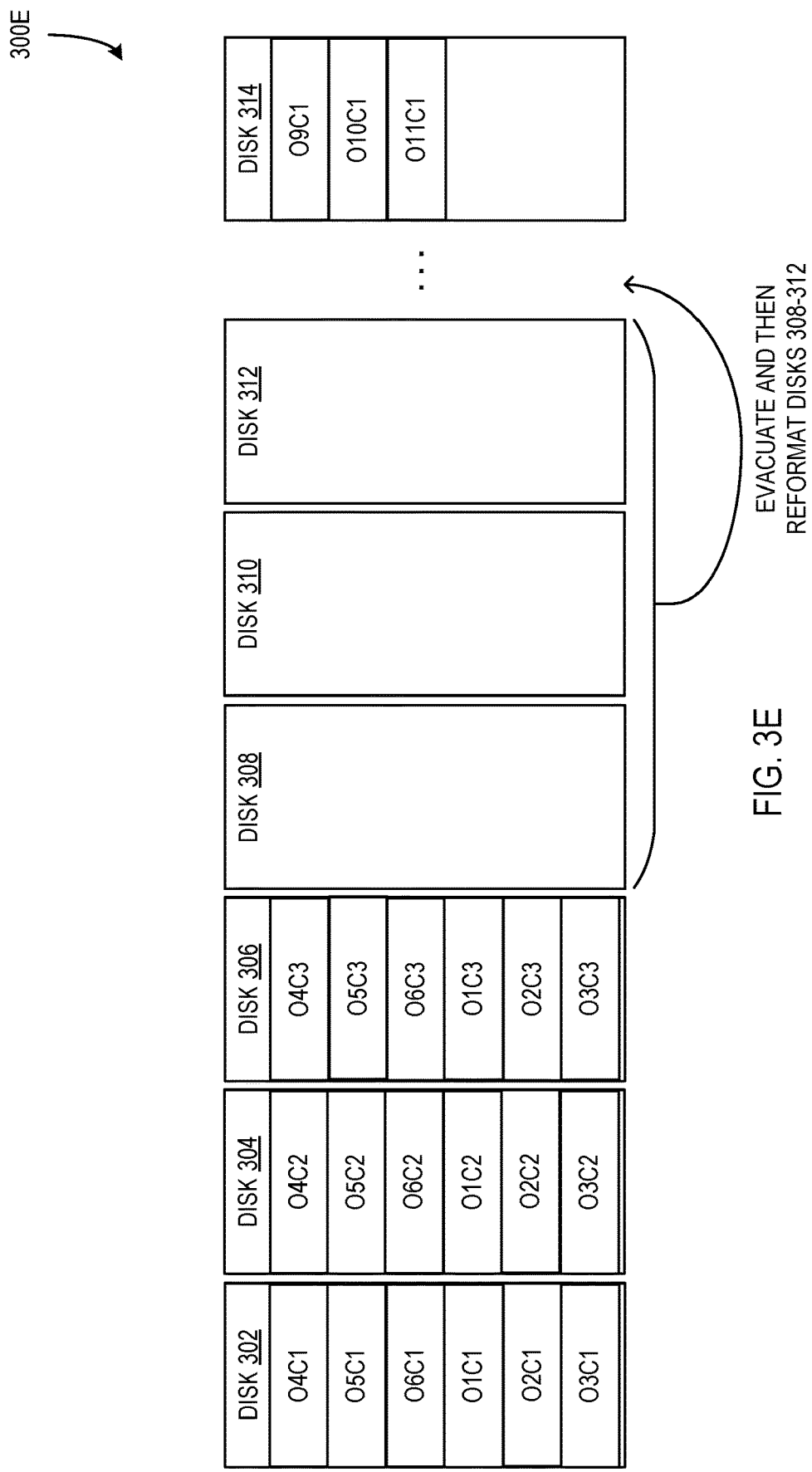

FIG. 3E illustrates a state 300E after which the two data object components O7C1 and O8C1 have been evacuated from the disks 310 and 312, respectively. In some such examples, the destination disk or disks of the two evacuated components are determined based on the free capacities of potential destination disks. For instance, in an example, a first disk has sufficient free capacity to store both data object components while a second disk does not, and the first disk is chosen as the destination disk for the evacuated data object components. Alternatively, or additionally, the destination disks of the two evacuated components are determined based on other factors, such as the disks upon which other data object components of the two data objects are stored, without departing from the description.

After the disks 308-312 are evacuated, they are reformatted according to a received format conversion instruction as described herein. In some examples, the reformatting process of the disks 308-312 is the same as the reformatting process of the disks 302-306, such that the disks 308-312 have the same format as the disks 302-306 after the reformatting process.

After disks 308-312 are reformatted, they are used as slack space disks just as disks 302-306 were used above with respect to FIG. 3C. Data objects that have not been converted are identified, converted, and stored in the reformatted disk 308-312. Then, the next group of emptiest disks is identified, evacuated, and reformatted. Data objects are then identified, converted, and stored on that newly reformatted group of disks. This process repeats until all the disks in the data cluster have been reformatted and all the data objects in the data cluster have been converted. It should be understood that this process of format conversion offers improved efficiency over other techniques by reducing the total quantity of data object writes to a value that is less than two times the total quantity of data objects.

Figure 4:
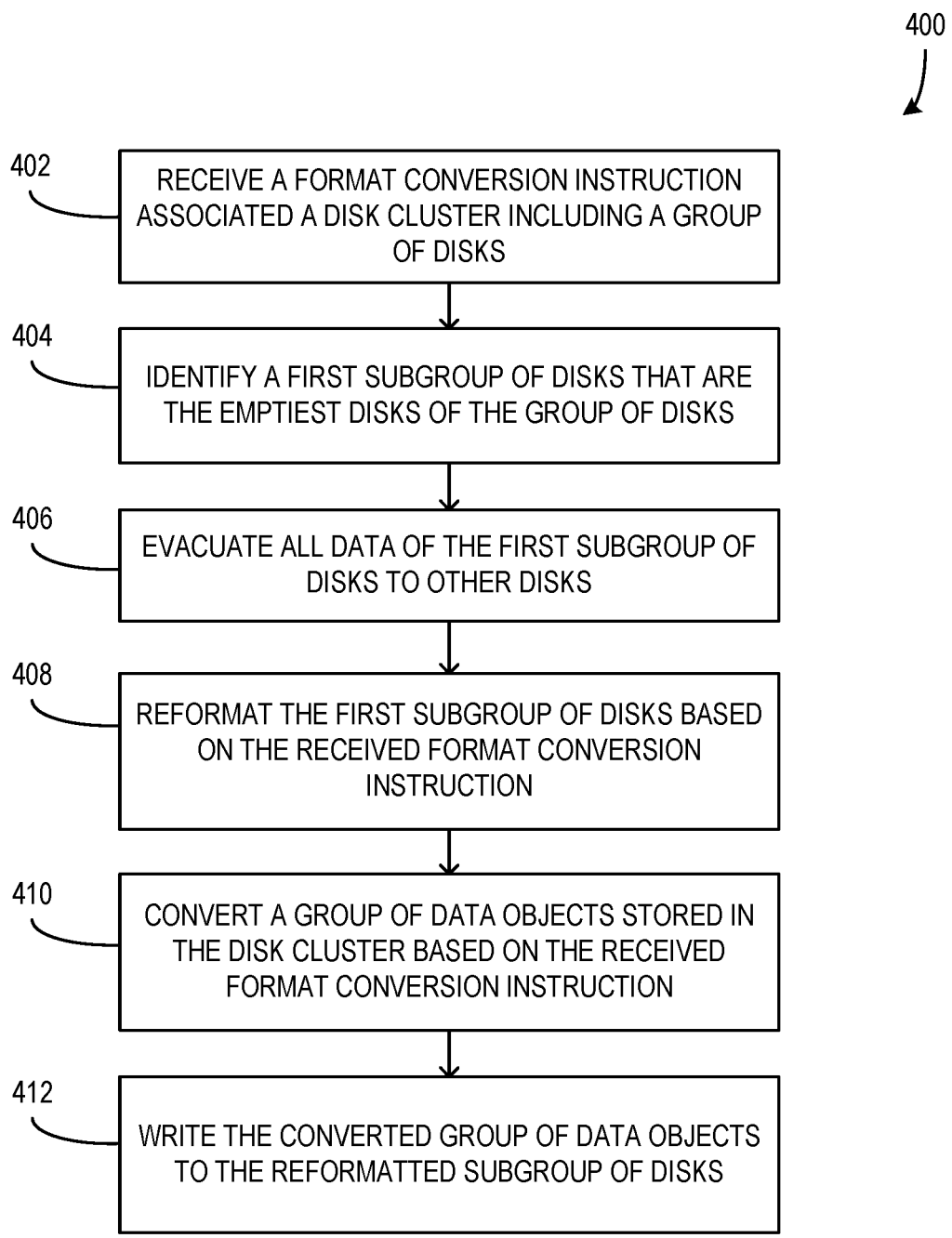
FIG. 4 is a flowchart illustrating a method for converting the format of a disk cluster according to an embodiment.

FIG. 4 is a flowchart illustrating a method 400 for converting the format of a disk cluster (e.g., disk cluster 204) and distributed object components stored thereon according to an embodiment. In some examples, the method 400 is executed or otherwise performed in association with a system such as systems 100 and/or 200 of FIGS. 1 and 2. Further, in some such examples, the method 400 is performed by an entity in such a system, such as the disk cluster manager 202 of FIG. 2.

At 402, a format conversion instruction associated with a disk cluster is received. The disk cluster includes a group of disks, such as the disks 206-210 of FIG. 2. In some examples, the format conversion instruction includes an instruction to encrypt the disk cluster, decrypt the disk cluster, and/or otherwise perform format conversion operations throughout the disk cluster, including reformatting each disk of the disk cluster and/or converting each data object stored in the disk cluster.

At 404, a first subgroup of disks is identified. The first subgroup of disks is determined by populating the subgroup with the emptiest disks of the group of disks of the disk cluster. In some examples, the emptiest disks are those disks that are currently storing the least quantity of data compared to the other disks of the group of disks and/or those disks that currently have the largest quantity of available or free storage space compared to the other disks of the group of disks. In some such examples, the associated system stores metadata associated with the disk cluster that indicates the current quantities of data stored in each disk and/or the current quantities of available storage space in each disk. Such metadata can be used to identify the emptiest disks.

In other examples, the first subgroup of disks is identified or determined by comparing a current quantity of stored data in a disk to a defined threshold. If the current quantity is less than or equal to the defined threshold, the disk is selected for inclusion in the first subgroup of disks. In such examples, the threshold used causes disks to be selected that currently store less data than many other disks in the disk cluster, comparatively. Further, the use of the threshold can result in the actual emptiest disk or disks being selected for inclusion in the first subgroup of disks. In still other examples, other methods of identifying the first subgroup of disks are used without departing from the description. It should be understood that selecting disks that currently store smaller quantities of data results in fewer data transfers when evacuating data from the first subgroup of disks during the next step. Reducing and/or minimizing this quantity of data transfers provides advantages with respect to system resource consumption by the method 400 as a whole.

At 406, all data stored in the first subgroup of disks is evacuated to other disks of the disk cluster. In some examples, the disks chosen as targets for the evacuation are from the set of disks that have not been reformatted yet. Further, in some examples, the disks chosen as targets for the evacuation are chosen in such a way as to enable data objects affected by the evacuation to be more easily transferred again later in the process (e.g., data object components of data objects are evacuated to disks in proximity with each other).

At 408, the first subgroup of disks is reformatted based on the received format conversion instruction. In some examples, the reformatting includes changing the format in which data is stored in the first subgroup of disks based on parameters and/or other information included in the format conversion instruction. Additionally, or alternatively, the reformatting includes encrypting the first subgroup of disks using a key and/or other encryption information in the instruction or decrypting the first subgroup of disks using a key and/or other decryption information in the instruction.

At 410, a group of data objects stored in the disk cluster are converted based on the received format conversion instruction. In some examples, the group of data objects are read from disks of the disk cluster to memory of computing device(s) of the system and then converted in memory. Further, in some examples, the conversion includes encrypting or decrypting the group of data objects using a key and/or other encryption or decryption information in the instruction.

In some examples, the group of data objects are selected for conversion to optimize the arrangement of stored data in the disk cluster for a next iteration of the method 400. For instance, in an example, a second subgroup of disks is determined from the group of disks that have not yet been reformatted, wherein the second subgroup of disks includes disks that are likely to be the next group of emptiest disks. The free or available data storage capacity of the second subgroup of disks is optimized by selecting data objects for the group of data objects that occupy larger portions of the second subgroup of disks when compared to all data objects that occupy the second subgroup of disks. Because the group of data objects will be converted and transferred to the first subgroup of disks at 412 of the method 400, by selecting data objects that occupy larger portions of the second subgroup of disks, the quantity of data transfers necessary to later evacuate the second subgroup of disks is reduced or minimized.

Additionally, it should be understood that the group of data objects is selected such that the group of data objects can be entirely stored in the first subgroup of disks and such that the storage space of the first subgroup of disks is substantially filled by the group of data objects (e.g., such that another entire data object cannot be stored in remaining available data storage capacity of the first subgroup of disks).

At 412, the converted group of data objects are written to the reformatted first subgroup of disks. In some examples, the converted group of data objects are written from memory of the system to the reformatted subgroup of disks for storage. Further, the data storage space occupied by the group of data objects in other disks of the disk cluster is freed for use in storing other data.

In some examples, the conversion of a group of data objects at 410 and writing the converted group of data objects to the reformatted subgroup of disks at 412 is performed iteratively. In such examples, a data object is converted and stored in the reformatted subgroup of disks. Then the remaining capacity of the reformatted subgroup of disks is analyzed to determine if another entire data object can be stored therein. If so, another data object is converted and written to the reformatted subgroup of disks. This iterative process is described below with respect to FIG. 5.

In some examples, machine learning (ML) techniques are used to optimize or otherwise improve the performance of the described methods herein. For instance, in some examples, an ML model is trained to analyze data storage patterns in the disk cluster to identify the most likely group of disks to be the emptiest disks during the next iteration of the described methods. Then, the data objects that occupy those identified disks are prioritized for conversion and transfer to the current group of reformatted disks as described herein. Thus, the quantity of data stored on the next subgroup of disks selected for reformatting is reduced, thereby reducing the resource costs associated with evacuating the data from the next subgroup of disks. Additionally, or alternatively, an ML model is trained to select data objects for conversion and transfer based on disk usage and/or object layout. For example, data objects that tend to occupy the same group of disks of the disk cluster are good candidates. As a result, when the data objects selected by the ML model are converted and transferred out of the group of disks, that group of disks is more likely to be empty or nearly empty, thereby reducing the resource costs associated with evacuating the data from the next subgroup of disks.

In some examples, such an ML model is trained using data storage patterns from past real states of disk clusters and/or simulated data storage patterns that are generated based on historical data. The ML model takes such data as input and generates a subgroup of disks that are likely to be the most efficient disks to use during a next iteration of the described methods. The generated subgroup of disks is compared to an optimal subgroup of disks and, based on the differences thereof, the ML model is adjusted to improve its accuracy. Additionally, or alternatively, the training of the ML model includes simulating an entire iterative process of converting the format of a disk cluster. The ML model generates the subgroups of disks for reformatting at each iteration and performance metrics of the process are tracked, such as total number of write operations performed during the process. The ML model is adjusted based on those tracked performance metrics and, over multiple iterations of such a simulation, the efficiency of the ML model is improved. In other examples, another ML model is trained a similar way to efficiently select the data objects for conversion and transfer to the current reformatted subgroup of disks.

Additionally, or alternatively, in some examples, an ML model is trained to identify data object components stored in the disk cluster that are likely to be affected by write instructions in the near future. This identified group of data object components are then avoided during the process of converting data objects and writing the converted data objects to the reformatted disks. Thus, this ML model enables the described methods to avoid or reduce interruptions of the normal operations of the disk cluster to the extent that it is possible to do so. In some such examples, the ML model is trained using data storage patterns of disk clusters, data and/or metadata associated with data objects, and/or data and/or metadata associated with individual data object components. The training data further includes historical logs or other similar data associated with write operations performed on a disk cluster over time. The ML model is then trained to classify data object components based on a predicted likelihood that they will be affected by write operations within a defined time period or otherwise produce output that indicates a relative likelihood that each data object component will be affected by a write operation within the defined time period. Using this output, the group of data object components that are most likely to be affected by a write operation is determined and used as described herein.

Figure 5:
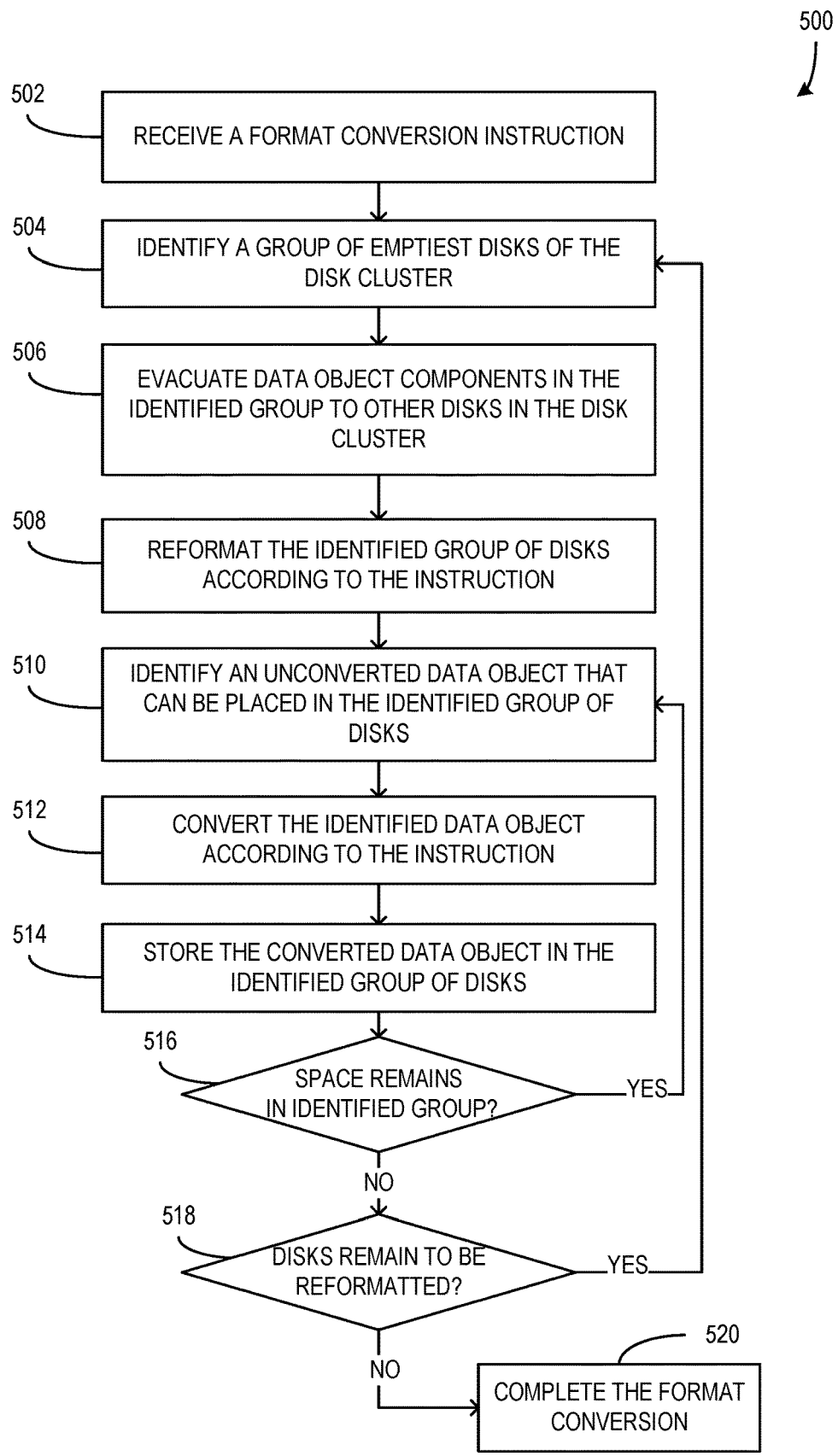
FIG. 5 is a flowchart illustrating a method for converting the format of a disk cluster using an iterative process according to an embodiment.

FIG. 5 is a flowchart illustrating a method 500 for converting the format of a disk cluster (e.g., disk cluster 204) and associated distributed object components thereon using an iterative process according to an embodiment. In some examples, the method 500 is executed or otherwise performed in association with a system such as systems 100 and/or 200 of FIGS. 1 and 2. Further, in some such examples, the method 500 is performed by an entity in such a system, such as the disk cluster manager 202 of FIG. 2.

At 502, a format conversion instruction is received. In some examples, the format conversion instruction includes an instruction to encrypt the disk cluster, decrypt the disk cluster, or otherwise convert the disk cluster to a different format.

At 504, a group of emptiest disks of the disk cluster is identified and, at 506, data object components stored in the identified group of disks are evacuated to other disks in the disk cluster.

At 508, the identified group of disks are reformatted according to the instruction.

At 510, an unconverted data object that can be placed in the identified group of disks is identified. In some examples, the unconverted data object is identified based on the group of disks having sufficient storage capacity to store the entire identified data object.

At 512, the identified data object is converted according to the instruction and, at 514, the converted data object is stored in the identified group of disks. In some examples, data of the identified data object stored on other disks in the disk cluster is removed from those other disks as well.

At 516, if space remains in the identified group of disks, the process returns to 510 to identify another unconverted data object. Alternatively, if sufficient space to store another entire data object is not available in the identified group of disks, the process proceeds to 518.

At 518, if disks remain to be reformatted in the disk cluster, the process returns to 504 to identify a next group of emptiest disks in the disk cluster from the subgroup of disks that have not been reformatted. Alternatively, if no disks remain to be reformatted, the process ends at 520 with completion of the format conversion.

It should be understood that, in some examples, the method 400 described above is performed as part of the method 500 and details described above with respect to method 400 also apply to method 500.

Exemplary Operating Environment

The present disclosure is operable with a computing apparatus according to an embodiment as a functional block diagram 600 in FIG. 6. In an example, components of a computing apparatus 618 are implemented as a part of an electronic device according to one or more embodiments described in this specification. The computing apparatus 618 comprises one or more processors 619 which may be microprocessors, controllers, or any other suitable type of processors for processing computer executable instructions to control the operation of the electronic device. Alternatively, or in addition, the processor 619 is any technology capable of executing logic or instructions, such as a hard-coded machine. In some examples, platform software comprising an operating system 620 or any other suitable platform software is provided on the apparatus 618 to enable application software 621 to be executed on the device. In some examples, converting disk clusters to different formats as described herein is accomplished by software, hardware, and/or firmware.

In some examples, computer executable instructions are provided using any computer-readable media that is accessible by the computing apparatus 618. Computer-readable media include, for example, computer storage media such as a memory 622 and communications media. Computer storage media, such as a memory 622, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Propagated signals per se are not examples of computer storage media. Although the computer storage medium (the memory 622) is shown within the computing apparatus 618, it will be appreciated by a person skilled in the art, that, in some examples, the storage is distributed or located remotely and accessed via a network or other communication link (e.g., using a communication interface 623).

Further, in some examples, the computing apparatus 618 comprises an input/output controller 624 configured to output information to one or more output devices 625, for example a display or a speaker, which are separate from or integral to the electronic device. Additionally, or alternatively, the input/output controller 624 is configured to receive and process an input from one or more input devices 626, for example, a keyboard, a microphone, or a touchpad. In one example, the output device 625 also acts as the input device. An example of such a device is a touch sensitive display. The input/output controller 624 may also output data to devices other than the output device, e.g., a locally connected printing device. In some examples, a user provides input to the input device(s) 626 and/or receives output from the output device(s) 625.

The functionality described herein can be performed, at least in part, by one or more hardware logic components. According to an embodiment, the computing apparatus 618 is configured by the program code when executed by the processor 619 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, or the like) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that are suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example system comprises a processor; and a memory comprising computer program code, the memory and the computer program code configured to cause the processor to: receive a format conversion instruction associated with a disk cluster including a group of disks; identify a first subgroup of disks of the group of disks that are the emptiest disks of the group of disks; evacuate all data of the first subgroup of disks to other disks in the group of disks; reformat the first subgroup of disks based on the received format conversion instruction; convert a group of data objects stored in the disk cluster based on the received format conversion instruction; and write the converted group of data objects to the reformatted first subgroup of disks.

An example computerized method comprises receiving a format conversion instruction associated with a disk cluster including a group of disks; identifying a first subgroup of disks of the group of disks that are the emptiest disks of the group of disks; evacuating all data of the first subgroup of disks to other disks in the group of disks; reformatting the first subgroup of disks based on the received format conversion instruction; converting a group of data objects stored in the disk cluster based on the received format conversion instruction; and writing the converted group of data objects to the reformatted first subgroup of disks.

One or more computer storage media having computer-executable instructions that, upon execution by a processor, case the processor to at least: receive a format conversion instruction associated with a disk cluster including a group of disks; identify a first subgroup of disks of the group of disks that are the emptiest disks of the group of disks; evacuate all data of the first subgroup of disks to other disks in the group of disks; reformat the first subgroup of disks based on the received format conversion instruction; convert a group of data objects stored in the disk cluster based on the received format conversion instruction; and write the converted group of data objects to the reformatted first subgroup of disks.

Alternatively, or in addition to the other examples described herein, examples include any combination of the following:

further comprising: determining that the first subgroup of disks has insufficient capacity to store other data objects; identifying a second subgroup of disks of the group of disks that are the emptiest disks of the group of disks; evacuating all data of the second subgroup of disks to other disks in the group of disks; reformatting the second subgroup of disks based on the received format conversion instruction; converting another data object stored in the group of disks that is unconverted based on the received format conversion instruction; and writing the other data object to the reformatted second subgroup of disks.

wherein identifying the first subgroup of disks of the group of disks that are the emptiest disks of the group of disks includes: determining a disk quantity using disk requirements of data objects stored on the group of disks; and identifying the first subgroup of disks, wherein the first subgroup of disks includes a quantity of disks equal to the determined disk quantity.

wherein converting the group of data objects based on the received format conversion instruction includes: determining a second subgroup of disks of the group of disks; and optimizing free capacity of the second subgroup of disks, the optimizing including: selecting the group of data objects from data objects stored at least partially in the determined second subgroup of disks, wherein the group of data objects selected occupies a portion of the second subgroup of disks that exceeds a threshold; and wherein writing the converted group of data objects to the reformatted first subgroup of disks includes removing the group of data objects from the second subgroup of disks.

wherein the optimizing of the free capacity of the second subgroup of disks is performed using a machine learning model.

wherein converting the group of data objects based on the received format conversion instruction includes: identifying a portion of data object components that are likely to be affected by write operations using a machine learning model; and selecting data objects to be included in the group of data objects from data objects that are not associated with the identified portion of data object components.

wherein the format conversion instruction includes an instruction to convert the disk cluster into an encrypted state or to convert the disk cluster into a decrypted state; wherein reformatting the first subgroup of disks based on the received format conversion instruction includes at least one of encrypting the first subgroup of disks or decrypting the first subgroup of disks; and wherein converting the group of data objects based on the received format conversion instruction includes at least one of encrypting the group of data objects or decrypting the group of data objects.

wherein the method repeats until all disks of the group of disks are reformatted, and all data objects stored in the disk cluster are converted.

Any range or device value given herein may be extended or altered without losing the effect sought, as will be apparent to the skilled person.

Examples have been described with reference to data monitored and/or collected from the users (e.g., user identity data with respect to profiles). In some examples, notice is provided to the users of the collection of the data (e.g., via a dialog box or preference setting) and users are given the opportunity to give or deny consent for the monitoring and/or collection. The consent takes the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute an exemplary means for receiving a format conversion instruction associated with a disk cluster including a group of disks; exemplary means for identifying a first subgroup of disks of the group of disks that are the emptiest disks of the group of disks; exemplary means for evacuating all data of the first subgroup of disks to other disks in the group of disks; exemplary means for reformatting the first subgroup of disks based on the received format conversion instruction; exemplary means for converting a group of data objects stored in the disk cluster based on the received format conversion instruction; and exemplary means for writing the converted group of data objects to the reformatted first subgroup of disks.

The term "comprising" is used in this specification to mean including the feature(s) or act(s) followed thereafter, without excluding the presence of one or more additional features or acts.

In some examples, the operations illustrated in the figures are implemented as software instructions encoded on a computer readable medium, in hardware programmed or designed to perform the operations, or both. For example, aspects of the disclosure are implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
    a disk cluster including a group of disks, the group of disks storing data object components of a plurality of data objects; and
    a disk cluster manager, wherein the disk cluster manager is configured to:
        receive a format conversion instruction associated with the disk cluster;
        identify a first subgroup of disks of the group of disks that are the emptiest disks of the group of disks;
        evacuate all data of the first subgroup of disks to other disks in the group of disks;
        reformat the first subgroup of disks based on the received format conversion instruction;
        convert a group of data objects stored in the disk cluster based on the received format conversion instruction; and
        write the converted group of data objects to the reformatted first subgroup of disks.

2. The system of claim 1, wherein the disk cluster manager is further configured to:
    determine that the first subgroup of disks has insufficient capacity to store other data objects;
    identify a second subgroup of disks of the group of disks that are the emptiest disks of the group of disks;
    evacuate all data of the second subgroup of disks to other disks in the group of disks;
    reformat the second subgroup of disks based on the received format conversion instruction;
    convert another data object stored in the group of disks that is unconverted based on the received format conversion instruction; and
    write the other data object to the reformatted second subgroup of disks.

3. The system of claim 1, wherein identifying the first subgroup of disks of the group of disks that are the emptiest disks of the group of disks includes:
    determining a disk quantity using disk requirements of data objects stored on the group of disks; and
    identifying the first subgroup of disks, wherein the first subgroup of disks includes a quantity of disks equal to the determined disk quantity.

4. The system of claim 1, wherein converting the group of data objects based on the received format conversion instruction includes:
    determining a second subgroup of disks of the group of disks; and
    optimizing free capacity of the second subgroup of disks, the optimizing including:
        selecting the group of data objects from data objects stored at least partially in the determined second subgroup of disks, wherein the group of data objects selected occupies a portion of the second subgroup of disks that exceeds a threshold; and
wherein writing the converted group of data objects to the reformatted first subgroup of disks includes removing the group of data objects from the second subgroup of disks.

5. The system of claim 4, wherein the optimizing of the free capacity of the second subgroup of disks is performed using a machine learning model.

6. The system of claim 1, wherein converting the group of data objects based on the received format conversion instruction includes:
identifying a portion of data object components that are likely to be affected by write operations using a machine learning model; and
selecting data objects to be included in the group of data objects from data objects that are not associated with the identified portion of data object components.

7. The system of claim 1, wherein the format conversion instruction includes an instruction to convert the disk cluster into an encrypted state or to convert the disk cluster into a decrypted state;
wherein reformatting the first subgroup of disks based on the received format conversion instruction includes at least one of encrypting the first subgroup of disks or decrypting the first subgroup of disks; and
wherein converting the group of data objects based on the received format conversion instruction includes at least one of encrypting the group of data objects or decrypting the group of data objects.

8. A computerized method comprising:
receiving a format conversion instruction associated with a disk cluster including a group of disks;
identifying a first subgroup of disks of the group of disks that are the emptiest disks of the group of disks;
evacuating all data of the first subgroup of disks to other disks in the group of disks;
reformatting the first subgroup of disks based on the received format conversion instruction;
converting a group of data objects stored in the disk cluster based on the received format conversion instruction; and
writing the converted group of data objects to the reformatted first subgroup of disks.

9. The computerized method of claim 8, further comprising:
determining that the first subgroup of disks has insufficient capacity to store other data objects;
identifying a second subgroup of disks of the group of disks that are the emptiest disks of the group of disks;
evacuating all data of the second subgroup of disks to other disks in the group of disks;
reformatting the second subgroup of disks based on the received format conversion instruction;
converting another data object stored in the group of disks that is unconverted based on the received format conversion instruction; and
writing the other data object to the reformatted second subgroup of disks.

10. The computerized method of claim 8, wherein identifying the first subgroup of disks of the group of disks that are the emptiest disks of the group of disks includes:
determining a disk quantity using disk requirements of data objects stored on the group of disks; and
identifying the first subgroup of disks, wherein the first subgroup of disks includes a quantity of disks equal to the determined disk quantity.

11. The computerized method of claim 8, wherein converting the group of data objects based on the received format conversion instruction includes:
determining a second subgroup of disks of the group of disks; and
optimizing free capacity of the second subgroup of disks, the optimizing including:
selecting the group of data objects from data objects stored at least partially in the determined second subgroup of disks, wherein the group of data objects selected occupies a portion of the second subgroup of disks that exceeds a threshold; and
wherein writing the converted group of data objects to the reformatted first subgroup of disks includes removing the group of data objects from the second subgroup of disks.

12. The computerized method of claim 8, wherein converting the group of data objects based on the received format conversion instruction includes:
identifying a portion of data object components that are likely to be affected by write operations using a machine learning model; and
selecting data objects to be included in the group of data objects from data objects that are not associated with the identified portion of data object components.

13. The computerized method of claim 8, wherein the format conversion instruction includes an instruction to convert the disk cluster into an encrypted state or to convert the disk cluster into a decrypted state;
wherein reformatting the first subgroup of disks based on the received format conversion instruction includes at least one of encrypting the first subgroup of disks or decrypting the first subgroup of disks; and
wherein converting the group of data objects based on the received format conversion instruction includes at least one of encrypting the group of data objects or decrypting the group of data objects.

14. The computerized method of claim 8, wherein the method repeats until all disks of the group of disks are reformatted, and all data objects stored in the disk cluster are converted.

15. A computer storage medium has computer-executable instructions that, upon execution by a processor, cause the processor to at least:
receive a format conversion instruction associated with a disk cluster including a group of disks;
identify a first subgroup of disks of the group of disks that are the emptiest disks of the group of disks;
evacuate all data of the first subgroup of disks to other disks in the group of disks;
reformat the first subgroup of disks based on the received format conversion instruction;
convert a group of data objects stored in the disk cluster based on the received format conversion instruction; and
write the converted group of data objects to the reformatted first subgroup of disks.

16. The computer storage medium of claim 15, wherein the computer-executable instructions, upon execution by the processor, further causes the processor to at least:
determine that the first subgroup of disks has insufficient capacity to store other data objects;
identify a second subgroup of disks of the group of disks that are the emptiest disks of the group of disks;
evacuate all data of the second subgroup of disks to other disks in the group of disks;

reformat the second subgroup of disks based on the received format conversion instruction;

convert another data object stored in the group of disks that is unconverted based on the received format conversion instruction; and write the other data object to the reformatted second subgroup of disks.

17. The computer storage medium of claim 15, wherein identifying the first subgroup of disks of the group of disks that are the emptiest disks of the group of disks includes:

determining a disk quantity using disk requirements of data objects stored on the group of disks; and identifying the first subgroup of disks, wherein the first subgroup of disks includes a quantity of disks equal to the determined disk quantity.

18. The computer storage medium of claim 15, wherein converting the group of data objects based on the received format conversion instruction includes:

determining a second subgroup of disks of the group of disks; and optimizing free capacity of the second subgroup of disks, the optimizing including:

selecting the group of data objects from data objects stored at least partially in the determined second subgroup of disks, wherein the group of data objects selected occupies a portion of the second subgroup of disks that exceeds a threshold; and wherein writing the converted group of data objects to the reformatted first subgroup of disks includes removing the group of data objects from the second subgroup of disks.

19. The computer storage medium of claim 15, wherein converting the group of data objects based on the received format conversion instruction includes:

identifying a portion of data object components that are likely to be affected by write operations using a machine learning model; and selecting data objects to be included in the group of data objects from data objects that are not associated with the identified portion of data object components.

20. The computer storage medium of claim 15, wherein the format conversion instruction includes an instruction to convert the disk cluster into an encrypted state or to convert the disk cluster into a decrypted state;

wherein reformatting the first subgroup of disks based on the received format conversion instruction includes at least one of encrypting the first subgroup of disks or decrypting the first subgroup of disks; and wherein converting the group of data objects based on the received format conversion instruction includes at least one of encrypting the group of data objects or decrypting the group of data objects.

* * * * *